UNITED STATES PATENT OFFICE.

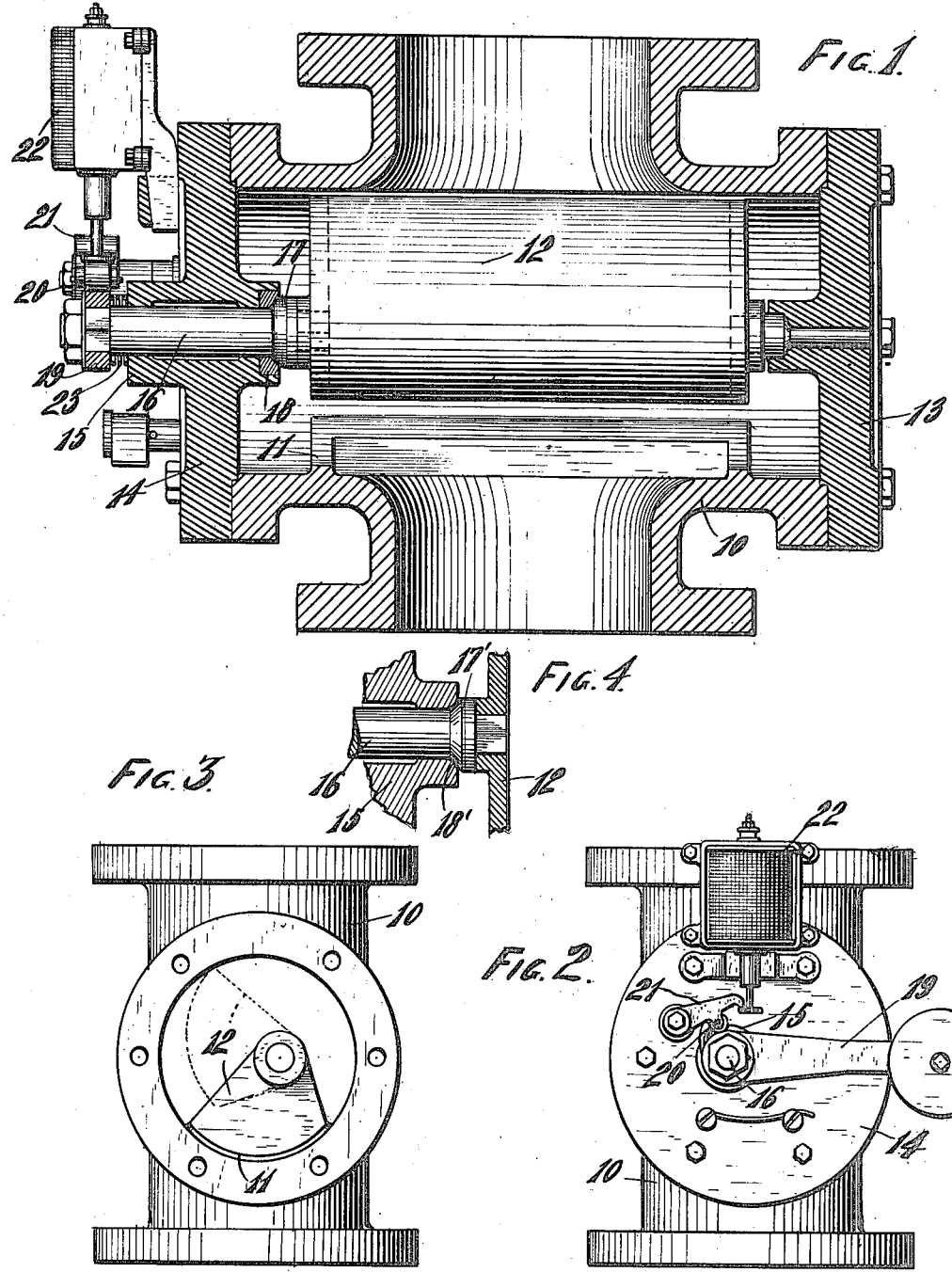

ANGELO ROBERT CLAS, OF SHEBOYGAN FALLS, WISCONSIN, ASSIGNOR TO FALLS MACHINE COMPANY, OF SHEBOYGAN FALLS, WISCONSIN, A CORPORATION OF WISCONSIN.

PACKINGLESS BEARING.

1,283,469.   Specification of Letters Patent.   Patented Nov. 5, 1918.

Application filed July 3, 1914. Serial No. 848,709.

*To all whom it may concern:*

Be it known that I, ANGELO ROBERT CLAS, a citizen of the United States, and resident of Sheboygan Falls, in the county of Sheboygan and State of Wisconsin, have invented new and useful Improvements in Packingless Bearings, of which the following is a description, reference being had to the accompanying drawings, which are a part of this specification.

This invention relates to packingless bearings for automatic engine stops, such as the engine stop mechanism covered by Letters Patent No. 1,014,669 to M. and J. Raymaker, dated January 16, 1912, and has for its object to avoid the necessity for a steam tight packing surrounding the valve stem where it passes out of the valve casing, thus relieving the valve of the resistance incident to the presence of a packing gland and rendering it more sensitive in its operation.

With the above and other objects in view the invention consists in the packingless bearing as herein claimed and all equivalents.

Referring to the accompanying drawings in which like characters of reference indicate the same parts in the different views:

Figure 1 is a sectional elevation of an automatic engine stop valve mechanism containing the packingless bearing of this invention;

Fig. 2 is a front view thereof; and

Fig. 3 is a rear view thereof with the rear plate removed showing the valve on its seat in full lines and open in dotted lines.

Fig. 4 is a sectional view of a modified form of the bearing.

In these drawings 10 indicates a valve casing in the form of a cylindrical valve chamber extending across a steam passageway and provided with a valve seat 11 with its face concentric with the cylindrical valve chamber. The valve chamber 12 is shaped to fit the valve seat and is pivotally mounted in the valve casing at a point to one side of the center of the valve casing so as to be eccentric thereto, the valve face only being concentric with the casing when in its closed position. This arrangement of the valve is designed to afford a minimum amount of friction in closing as well as a maximum valve clearance for a minimum valve movement and as the operation of the valve is intended to be automatic the packingless bearing of this invention is provided for the valve stem. A casing head 13 closes the end of the cylindrical casing at the rear thereof and has the valve pivotally mounted therein in any desirable manner, while a casing head 14 similarly closing the front end of the valve casing forms a tubular bearing sleeve 15 through which the valve stem 16 passes. The valve stem 16 has a squared end fitting into a socket in the end of the valve 12, and also has an annular shoulder 17 which is rounded or convexed upon its outer surface. A bushing 18 of a non-corrosive metal is fitted into a recess provided for it in the inner end of the bearing sleeve 15 and is preferably held in place by having a tight driving fit within such recess and this bushing at its inner edge is beveled so as to coöperate with the rounded or spherical surface of shoulder 17 in producing a steam tight fit. The beveled seat may be on the casing head direct instead of on a bushing. In order to insure a perfectly close fit of these parts they are preferably lapped together.

At the outer end of the valve stem 16 is secured a weighted arm 19 fitting on a squared portion of the valve stem and having a projecting horn 20 engaged by a pivoted dog 21 which is released by a solenoid 22 or otherwise to permit the weighted arm to drop and swing the valve 12 to its closed position upon the occurrence of an abnormal speed of the engine receiving steam through the valve mechanism, or upon the operation of hand controlling means or otherwise. The pressure of the steam within the valve chamber serves to forcibly hold the valve stem 16 firmly against the bushing 18 to maintain the steam tight fit between the beveled surface of the bushing and the rounded or spherical surface of the valve stem shoulder 17, and a coil spring 23 surrounding the valve stem and bearing against the arm 19 and the bearing sleeve 15 respectively serves to retain such close fitting contact between the bushing and the shoulder at times when there is no steam pressure within the valve casing.

By means of this invention the resistance to the turning of the valve that is caused by the ordinary packing gland to prevent the escape of steam around the valve stem is entirely avoided and the valve has, therefore, more freedom of action and is more sensitive to operation by the weighted arm when the latter is released.

It is obvious that the bearing surface may be formed on the bearing sleeve 15 direct instead of on the bushing 18 and it may be convexed as shown by the bearing surface 18' in Fig. 4 with a corresponding change in the bearing surface of the shoulder 17 so that it is beveled instead of convexed.

What I claim as new and desire to secure by Letters Patent is:

1. In an engine stop valve mechanism, a valve casing having a valve seat, a valve member within the valve casing adapted to fit upon the valve seat, a valve stem connected with the valve member and passing through an opening in the valve casing, a bushing fitting in the valve casing around the opening and provided with a beveled bearing surface, an annular shoulder on the valve stem having a spherically curved bearing surface fitting against the beveled bearing surface of the bushing with a line contact, a weighted arm mounted on the valve stem outside of the valve casing for closing the valve, a spring for holding the valve stem in its engagement with the bushing, and means for releasably engaging the weighted arm to normally hold the valve off of its seat.

2. An engine stop valve mechanism, comprising a valve casing containing a steam passageway intercepted by a cylindrical valve chamber containing a concentric valve seat, a valve member adapted to fit on the valve seat, casing heads at the ends of the valve chamber in which the valve member is pivotally mounted eccentric to the valve chamber, a valve stem forming one of the pivotal connections of the valve member having a square end removably fitting in the end of the valve member and provided with an annular shoulder having a spherically rounded bearing surface, a tubular sleeve on one of the casing heads through which the valve stem passes, a bushing fixed within the tubular sleeve and having a beveled bearing surface fitting against the spherical bearing surface of the valve stem shoulder with a line contact, a weighted arm fixed on the valve stem outside of the valve casing, a coil spring surrounding the valve stem and bearing against the weighted arm and the sleeve respectively, and means for releasably engaging the weighted arm.

In testimony whereof, I affix my signature, in presence of two witnesses.

ANGELO ROBERT CLAS.

Witnesses:
H. A. LANDWEHR,
J. G. LUDE.